C. M. PAPON.
PNEUMATIC TIRE.
APPLICATION FILED DEC. 3, 1912.
1,104,824. Patented July 28, 1914.
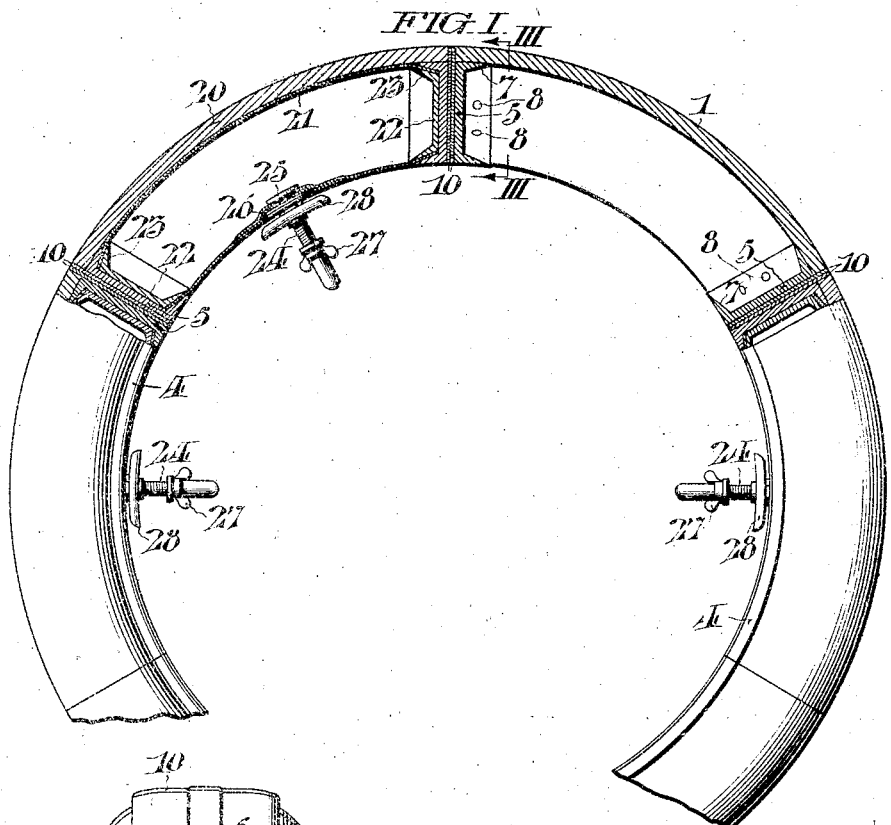
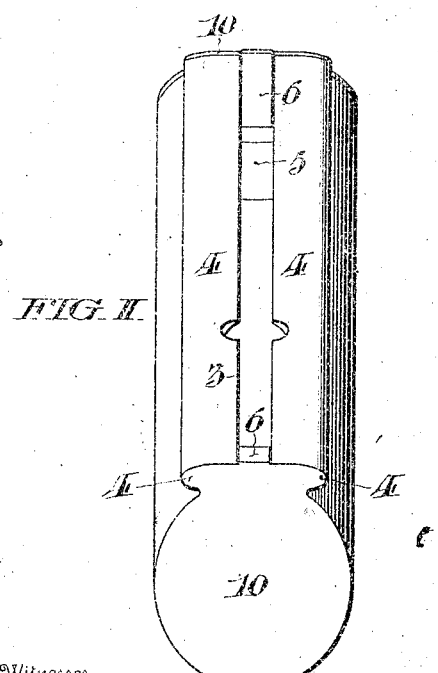
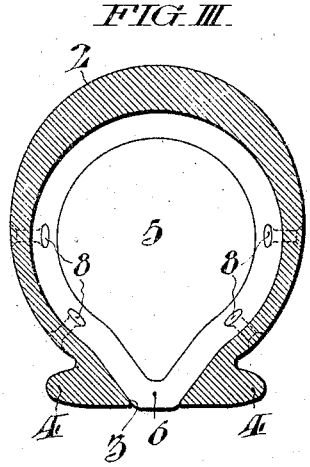
Witnesses
John C. Berger
James H. Bell
Inventor
Charles M. Papon,
Attorneys

UNITED STATES PATENT OFFICE.

CHARLES M. PAPON, OF PHILADELPHIA, PENNSYLVANIA, ASSIGNOR OF ONE-HALF TO EUGENE BLEYER, OF LAVEROCK, PENNSYLVANIA.

PNEUMATIC TIRE.

1,104,824.      Specification of Letters Patent.      Patented July 28, 1914.

Application filed December 3, 1912. Serial No. 734,667.

*To all whom it may concern:*

Be it known that I, CHARLES M. PAPON, formerly of Cannes, in the Republic of France, and now residing in the city of Philadelphia, county of Philadelphia, and State of Pennsylvania, have invented certain new and useful Improvements in Pneumatic Tires, whereof the following is a specification, reference being had to the accompanying drawings.

My improvements relate to that class of tires intended for use in connection with automobiles and similar motor vehicles, in which the tire, as a whole, is constructed in a plurality of independent segmental portions, and the principal objects of my invention are to simplify the initial construction of such tires, to prolong the life thereof, and to afford the most desirable conditions at the meeting edges of the tire segments.

In the drawings, Figure I, represents a longitudinal section through a portion of a tire embodying my improvements. Fig. II, is a view in perspective of one of the tire segments as seen from what may be termed the inner side thereof. Fig. III, is a transverse section on the line III, III, of Fig. I.

Referring to the tire as a whole, it comprises a plurality of casing segments, preferably six in number, each subtending an equal arc of the total circumstances (in this instance sixty degrees) and a similar number of inner tubular segments adapted to be independently inflated. For clearness of illustration I have shown in Fig. I, the casing segment marked 1, without its inner pneumatic tube, and the casing segment marked 20, as comprising the complete structure with the inner tube in position and inflated.

As the casing segments, respectively, and the pneumatic tube segments, respectively, are counterparts of one another, it will only be necessary to describe in detail a single one of each, and for such purpose I shall now refer to the details in construction of that casing segment which is indicated at 1, in Fig. I.

The casing segment may be economically and readily constructed as follows: An ordinary annular tire casing, having the cross section indicated at 2, in Fig. III, and therefore provided with the usual seating member 4, adapted to engage with the inwardly projecting edges of the tire-seat upon the felly, and also having the longitudinal slot 3, extending through said seating member, is cut into symmetrical segments of the proper length, each preferably corresponding to sixty degrees of the total circumference. Each end of said cut portion is then closed by means of a deeply dished plug 5, whose external periphery fits snugly within the rounded wall of the casing, the plug being provided with a lateral extension 6, fitting into and closing the end of the slot 3, of the casing, as shown clearly in Fig. III. The inwardly extending peripheral wall which forms the dish of said plug is tapered, as indicated at 7, so that at its extremity it practically vanishes to a sharp edge. Said plug may be formed entirely of rubber, or of any suitable compound thereof, containing fabric, such as is adapted for use in tire construction, but it should be of such a character as to be capable of being applied and secured, by vulcanization, to the inner surface of the casing. I prefer to provide as an adjunctive securing means, rivets 8, which extend through the thicker part of the wall 7, of the plug and the adjacent portion of the casing. Upon the external end surface of the plug, and of the surrounding casing, I then apply, and vulcanize in position, a layer 10, of rubber, which thus completely covers the joint between the plug and the casing.

By reference to Figs. II, and III, it will be noted that the plug and the wall thereof, close the slot 3, for a short distance from the end, the tapered wall however, permitting the sides of the slot to give somewhat as they are spread apart for the purpose of admitting the deflated inner tube. It will be understood that both ends of the segments are closed, in the manner just described.

Referring now to the segment marked 20, in Fig. 1, which indicates the inner pneumatic tube in position, it will be seen that said inner tube 21, is segmental, and that each segment is closed, at each end, by means of a deeply dished plug 22, whose wall 23, is tapered preferably both internally and externally, the external surface substantially conforming to the internal surface of the wall 7, of the casing plug, so that when inflated, there is a snug fit at the end region. Each inner tube segment is also provided with an individual inflating nozzle 24, having at its inner extremity a flange 25, and intervening reinforcing pieces 26. Said nozzle is also provided with a wing nut 27, and clamping piece 28, which may be of the ordinary type and which serve to clamp the tire segment to its seat upon the felly. The inner tube segments can be readily obtained by cutting an ordinary annular pneumatic tire tube into portions of the proper length and applying to each an ordinary nozzle. Thus it will be noted that my improved tire can be, to a great extent, constructed from readily procurable standard articles, and that only the plugs need be specially made. The inner tube segment can, when in a deflated condition, be readily inserted within its casing segment, by distending the slot in the latter, and, when subsequently inflated, can be forced into proper position. The meeting ends of the adjacent segments being provided with the layers of rubber 10, above described, make a tight fit with one another, and thus prevent the admission of grit or other abrasive substances, and also of moisture.

I am aware that it is not new to construct pneumatic tires in removable segments, and I do not broadly claim the same, the features of my invention being addressed to the improvement of the structure of the independent sections of the casing segments themselves, and also of the inner tube segments as above set forth.

While I have described a convenient method of procedure for the construction of my improved tire, which permits the utilization of certain standard parts, it will of course be understood that I do not limit myself to the employment of elements so made.

I claim:

1. In a pneumatic tire, comprising a plurality of independently removable segment portions, the combination of a casing segment having a longitudinal slot; independent dished end plugs having tapered annular walls fitting snugly within the respective ends of said casing segment, and secured therein to form a substantially tight joint, with the inner wall of the casing; and an inner pneumatic tube segment, having end portions which conform externally in shape to the inner surface of the end plugs of the casing segment, substantially as set forth.

2. In a pneumatic tire, comprising a plurality of independently removable segment portions, the combination of a casing segment having a longitudinal slot; independent dished end plugs having tapered annular walls fitting snugly within the respective ends of said casing segment, said end plugs having projecting portions which extend into the ends of said slot, said end plugs and projections being secured in position by a substantially tight joint, with the wall of the casing; and a layer of rubber applied over the entire exterior end surface of each end plug and the surrounding end portion of the casing, substantially as set forth.

In testimony whereof, I have hereunto signed my name at Philadelphia, Pennsylvania, this twenty-seventh day of November, 1912.

CHARLES M. PAPON.

Witnesses:
JAMES H. BELL,
E. L. FULLERTON.